Jan. 18, 1938.   F. R. WEST   2,105,714
BOLT AND CHAIN LOCK
Original Filed Dec. 30, 1933
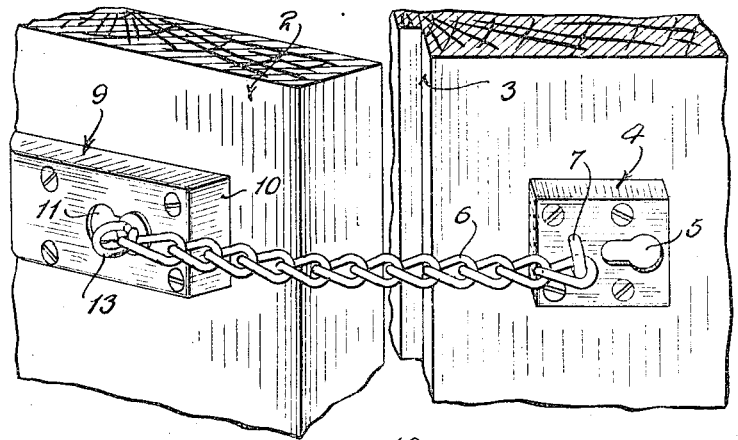
Fig. 1.
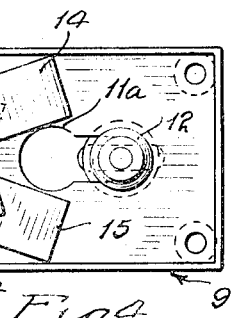
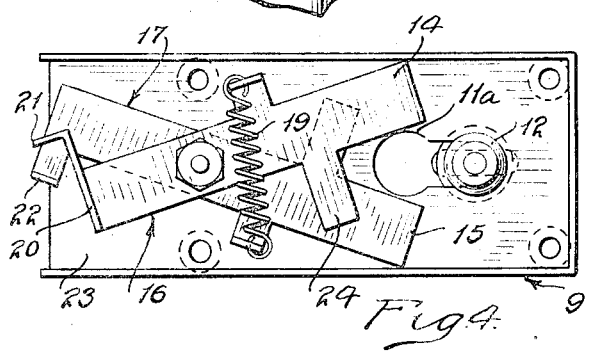
Fig. 4.
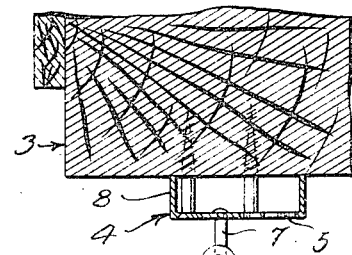
Fig. 2.
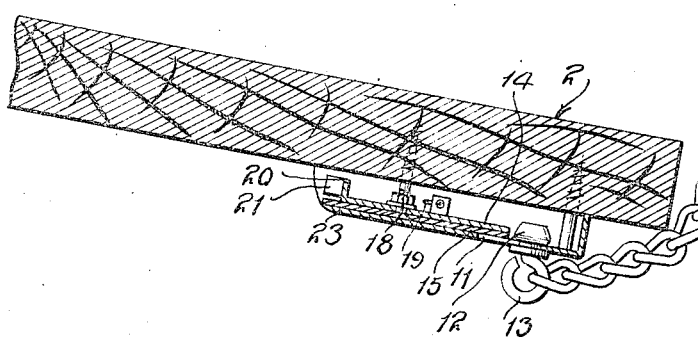
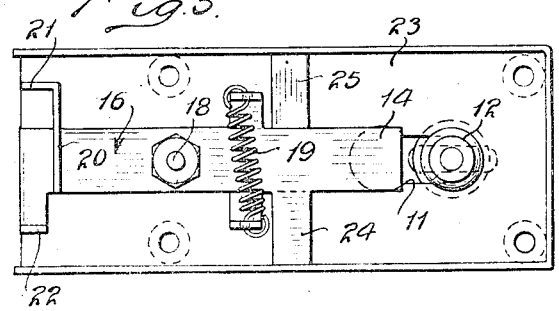
Fig. 5.
Fig. 3.
INVENTOR.
FRANK R. WEST.
BY
Barnes, Kisselle & Laughlin
ATTORNEYS.

Patented Jan. 18, 1938

2,105,714

UNITED STATES PATENT OFFICE 2,105,714

BOLT AND CHAIN LOCK

Frank R. West, Detroit, Mich.

Application December 30, 1933, Serial No. 704,675
Renewed June 16, 1937

13 Claims. (Cl. 292—264)

This invention relates to a bolt and chain lock, and has to do particularly with construction of the retaining member for the bolt.

Heretofore, the standard type of bolt and chain lock has usually included a keeper member fastened to the door casing, a standard eight inch chain and a bolt at the end thereof, and a retaining member with a relatively long key slot. If the length of such slot and chain are such as to permit the insertion of even small packages or newspapers through a door, whose opening is checked by such a chain lock, it is possible for one to reach his hand in through the opening and very easily push the bolt from the slot.

It is the object of the present invention to provide a retaining member for the bolt so constructed as to positively prevent the release of the bolt from the retaining member even though the length of the chain permits the door to open to an extent sufficient to admit even large packages. More specifically, the present invention contemplates a bolt retaining device requiring two separate operations to release the bolt therefrom. The preferred embodiment of the invention embodies a double impeding or locking device for the bolt, so positioned as to be operable by two fingers or a finger and thumb of one hand, the bolt being so retained as to make it impossible to actuate the bolt with the same hand that actuates the plurality of impeding members.

Other features of the invention including the structure of the double impeding elements, the location of the slot in the retaining member for the bolt, and the positioning and shape of the impeding members which are actuated by the hand, will be more clearly set forth in the specification and claims.

In the drawing:

Fig. 1 is a fragmentary perspective view of a door and casing equipped with a bolt and chain embodying the present invention.

Fig. 2 is a fragmentary cross sectional view showing the chain bolt in locked position in the retainer member.

Fig. 3 is an end view of the retainer member and illustrating particularly the preferred form of double impeding members.

Fig. 4 is a rear plan view of the structure shown in Fig. 3 and with the impeding members in releasing position.

Fig. 5 is a view similar to Fig. 4 but with the impeding members in closed position.

It will be distinctly understood that the main features of the present invention may be embodied in chain locks of the present type, in many different forms; that is, the retainer member may vary considerably, the two or more impeding members may vary considerable as well as the shape of the bolt, as will be well understood by those skilled in the art. To show the many different obvious modifications in this particular case would tend to be confusing.

In the embodiment illustrated in the drawing the conventional door is illustrated as at 2 and the casing at 3. A keeper 4 of standard design and having a keeper slot 5 normally carrying a chain 6 as by means of an eye 7, is secured to the casing 2. In the present form this keeper member 4 has side members 8 of greater depth than usual so that the keeper presents a symmetrical appearance with a retainer member 9.

The standard length of chain for this type of lock is about eight inches, but as will be presently described, my retainer member is such that this chain may be used and it is unnecessary to substantially close the door before inserting the bolt in place. The retainer member 9 is preferably of a length comparable to the standard type bolt retainer member and positioned inwardly a short distance from the inner edge 10 of the retainer I have provided a key shaped opening or slot 11, the larger opening of which is of sufficient size to receive the head 12 of a bolt 13.

Adapted to close the opening 11a of the bolt receiving slot 11 are the inner portions 14 and 15 of impeding members, generally designated 16 and 17. These impeding members are pivoted as at 18 to the front face of the retainer member 9 and are normally urged towards the closed position (as shown in Fig. 5) by a spring 19. The impeding member 16 is provided with an angular portion 20 which terminates in an operating trigger or finger rest member 21. The other impeding member 17 has an angular end formation which also terminates in a similar trigger or finger rest member 22.

Both of the triggers 21 and 22 are preferably substantially concealed when in their normal position (as shown in Fig. 5) by the face portion 23 of the retainer member. The purpose of this is to make it practically impossible for anyone reaching through the door in its wide open package receiving position to actuate these trigger members but at the same time making it relatively easy for a person on the inside to merely place a thumb and forefinger on the two triggers and separate the impeding members to the position shown in Fig. 4. The end of the casing is preferably rounded, as best shown in Fig. 1, to make the locking device fool-proof, even against studied attempts by expert housebreakers to release the bolt. The closed position of the impeding members 16 and 17 is determined by stop members 24 and 25.

In operation it will be seen that all that is necessary to operate my bolt and chain lock structure, even with the door in substantially its wide open package receiving position, is to place the thumb and forefinger on the triggers 21 and 22 to move the same about the pivot 18. When the finger is moved all the way inwardly the closure members 14 and 15 will uncover the opening 11a permitting the bolt to be slipped into place. Release of the triggers 21 and 22 will permit the spring 19 to snap the ends 14 and 15 into the position shown in Fig. 5, which position is predetermined by the length of the stop members 24 and 25. It will thus be seen that even if it were possible for one to reach their full arm through the door and move the triggers 21 and 22 inwardly they will have no means of then releasing the bolt 13 because it will be impossible to reach the other hand through the opening between the door and the casing, thus by making at least two separate operations necessary to release the bolt it will be seen that all the usefulness of one arm and the hand thereon is made necessary to accomplish the opening. This double impeding device not only requires two separate operations but is distinct and independent of the locking stud. This arrangement makes it possible to provide maximum safety and at the same time permit removal of the bolt from the retainer member without closing the door against someone whom the occupant wishes to admit. The illustrated form of the fingers and impeding elements themselves is the simplest and what is believed to be the most practical and it will be readily seen that the two or more impeding members may vary widely in structural details and still retain the important features and making two separate operations necessary to release the bolt.

It will be understood that the present invention is particularly tied up with the idea that the door may be opened to a relatively wide package receiving position but, of course, still not wide enough to permit a relatively thin or small person to wedge a portion of his body in the door. A five or six inch opening will allow the admission of a large sized package and still not permit even the thinnest person to accomplish any more than the actuation of the covered operating triggers; and even at six inches it will be impossible for the ordinary person to even reach the operating fingers, and all this is accomplished with a relatively short chain length comparable to what is now standard practice. On the other hand, if the door is only to be opened enough for the person on the inside to look through, but not wide enough for the receiving of a package, then there is no problem involved and the present safety device would not be necessary. Even with a two inch opening the ordinary stud and slot retaining member may be opened by pushing the hand through slightly past the rest and using a pencil which moved in an arc would easily dislodge the bolt.

What I claim is:

1. A safety lock of the bolt and chain type for securing a door in a partially opened position, comprising a part for attachment to a door casing and a flexible connection including a lock member extending therefrom, a retainer member secured to the door and having a slot for receiving said locking device, and a plurality of impeding members each independently and normally completely closing the entrance to said slot.

2. A safety lock of the bolt and chain type for securing a door in a partially opened position, comprising a part for attachment to a door casing and a flexible connection including a locking member extending therefrom, a retainer member secured to the door and having an opening and a slot for receiving said locking device, a plurality of impeding members each independently and normally substantially closing the entrance to said slot, and operating triggers for said impeding members normally concealed by said retainer member.

3. A safety lock of the bolt and chain type for securing a door in a partially opened position, comprising a part for attachment to a door casing and a flexible connection including a locking member extending therefrom, a retainer member secured to the door and having an opening and a slot for receiving said locking device, a plurality of impeding members each independently and normally closing said opening against the locking means when in the slot, and operating triggers forming the sole actuating means for said impeding members normally concealed by said retainer member, the uncovering of said opening to permit release of the locking member requiring operation of both triggers.

4. A safety lock of the bolt and chain type for securing a door in a partially opened position comprising a part for attachment to a door casing and a flexible connection including a locking member extending therefrom, a retainer member secured to the door and having an opening for receiving said locking device, a plurality of overlapping impeding members each independently and normally closing said opening, and operating triggers for said impeding members normally concealed by said retainer member, the uncovering of said opening to permit release of the locking member requiring complete operation of both triggers.

5. A retainer member for bolt and chain locks comprising a casing having an opening for receiving a chain locking member, and a plurality of overlapping impeding members each independently closing said opening and holding the locking member in locked position, said impeding members having portions extending to and operable only from the portion of said retaining member spaced farthest away from the door opening.

6. A retainer member for bolt and chain locks comprising a casing having an opening in its face for receiving a chain locking member, a relatively short slot for permitting movement of the locking member after insertion through said opening, said opening and slot forming the only opening in the face of the casing and a plurality of impeding members each independently having overlapping portions closing said opening to prevent movement of the locking member from the slot into said opening, said impeding members having portions extending to and operable only from the portion of said retaining member spaced farthest away from the door opening.

7. A retainer member for bolt and chain locks comprising a casing having an opening for receiving a chain locking member, and a plurality of overlapping impeding members each independently closing said opening and holding the locking member in locked position, said impeding members being concealed by said retaining member and having portions extending to and operable only from the portion of said retaining member spaced farthest away from the door opening.

8. A retainer member for bolt and chain locks comprising a casing having an opening for receiving a chain locking member, and a plurality of overlapping impeding members each independently closing said opening and holding the locking member in locked position, said impeding members being concealed by said retaining member and having portions extending to and operable only from the rear portion of said retaining member.

9. A safety lock of the bolt and chain type for securing a door in a partially opened position, comprising a part for attachment to a door casing and a flexible connection including a locking member extending therefrom, a retainer member secured to the door and having an opening for receiving said locking device, a plurality of overlapping impeding members each independently normally closing said opening, operating triggers forming the sole actuating means for said impeding members normally concealed by said retainer member, the uncovering of said opening to permit release of the locking member requiring operation of both triggers, and resilient means for normally tending to move the impeding members towards closing position.

10. A safety lock of the bolt and chain type for securing a door in a partially opened position, comprising a part for attachment to a door casing and a flexible connection including a locking member extending therefrom, a retainer member secured to the door and having an opening for receiving said locking device, a plurality of overlapping impeding members each independently and normally closing said opening, operating triggers for said impeding members normally concealed by said retainer member, the uncovering of said opening to permit release of the locking member requiring operation of both triggers, resilient means for normally tending to move the impeding members towards closing position, and means for positioning the impeding members across said opening in said normal position.

11. A safety retainer member for bolt and chain locks comprising a casing having an opening for receiving a chain locking member, a slot formed in the face of the casing and extending from said opening for receiving said member, and a plurality of impeding members each independently positioned for normally obstructing said opening to hold the locking means within the slot, said impeding members terminating short of said slot but covering a sufficient portion of said opening to prevent the return of said locking means, the face of said casing being completely closed except for said opening and slot, said impeding members extending to and operable only from the rear portion of said retaining member, the uncovering of said opening to permit movement of said locking member from the slot to the opening requiring simultaneous operation of all of said impeding members.

12. A safety lock of the bolt and chain type for securing a door in a partially opened position, comprising a part for attachment to a door casing and a flexible connection including a locking member extending therefrom, a retainer member secured to the door and having an opening and a slot for receiving said locking device, said retainer member and said slot being so positioned as to permit the insertion of the locking member into the opening to the slot while the door is substantially in said partially opened position, and a plurality of impeding members normally closing the opening in the retainer member to prevent movement of the locking device from the slot into said opening.

13. A safety lock of the bolt and chain type for securing a door in a partially opened position, comprising a part for attachment to a door casing and a flexible connection including a locking member extending therefrom, a retainer member secured to the door and having an opening and a slot for receiving said locking device, and a plurality of impeding members covered by said retaining member and each normally closing the opening in said member to prevent movement of the locking device from the slot into said opening.

FRANK R. WEST.